United States Patent

Reiter

[15] 3,684,869

[45] Aug. 15, 1972

[54] LABEL OR TICKET SYSTEM

[72] Inventor: Werner Reiter, Werner am Ruhrstein 50, 43 Essen-Bredeney, Germany

[22] Filed: July 14, 1970

[21] Appl. No.: 54,795

[30] Foreign Application Priority Data

July 15, 1969 Germany..........P 19 35 846.4

[52] U.S. Cl.......235/61.12 M, 117/239, 235/61.11 D

[51] Int. Cl.........G06k 19/02, G06k 7/08, G11b 5/72

[58] Field of Search......................117/239, 233, 235; 235/61.12 R, 61.11 D, 61.7 B; 340/174.1; 274/41.4; 340/149 A

[56] References Cited

UNITED STATES PATENTS

| | | | |
|---|---|---|---|
| 3,553,440 | 1/1971 | Dale | 235/61.12 R |
| 3,108,824 | 10/1963 | Fischer | 235/61.11 D X |
| 2,914,746 | 11/1959 | James | 235/61.12 M |
| 3,513,298 | 5/1970 | Riddle | 235/61.11 D |
| 3,293,066 | 12/1966 | Haines | 117/235 X |
| 3,205,092 | 9/1965 | Rosenberg | 117/235 |
| 2,547,838 | 4/1951 | Russell | 235/61.12 M |
| 2,557,022 | 6/1951 | Wolowitz | 235/61.12 M |

OTHER PUBLICATIONS

Marchese, Antistatic Protective Coating for Magnetic Recording Surfaces, June 1964, IBM Tech. Disc. Bulletin, Vol. 7, No. 1, p. 2

*Primary Examiner*—Maynard R. Wilbur
*Assistant Examiner*—Robert M. Kilgore
*Attorney*—Karl F. Ross

[57] ABSTRACT

A continuous strip of labels or tickets, separatable transversely of the strip and having broad surfaces adapted to receive legible matter, is provided along an edge with magnetic-recording means in zones subdivided in the region of separation of the labels or tickets.

4 Claims, 5 Drawing Figures

WERNER REITER

INVENTOR.

BY

Karl F. Ross

Attorney

LABEL OR TICKET SYSTEM

1. FIELD OF THE INVENTION

My present invention relates to a label or ticket system and, more particularly, to an arrangement of tickets or labels, especially for merchandise, adapted to be used in electronic processing machines.

2. BACKGROUND OF THE INVENTION

In the art of magnetic recording, it has become a common practice to provide a magnetic trace upon a substrate. For example, in accounting systems, checks and the like, magnetic ink may be provided upon a paper substrate, e.g. a check blank, to identify the account of the user or to provide other means for generating an appropriate response in electronic data processing machines. In general, the magnetic ink is printed in a configuration (e.g. of numerals) to which a magnetic-field-responsive reader is sensitive for sorting, debiting or like purposes.

Also in the art of magnetic data processing, information storage and reproduction, it has been proposed to provide a magnetically polarizable strip upon an appropriate support. For example, magnetic tape recordings provide relatively thin synthetic-resin foil bands which are coated with a ferrite-type of magnetic material and are used in conjunction with magnetic recording heads capable of applying an appropriate magnetic pattern to the tape and playback heads for deducing the pattern and providing corresponding output. Similar tapes are employed as data-storage and data-processing means in electronic computers, bookkeeping machines and the like, or for video and other recording.

Also, in this field, it is known to provide sheets of magnetic material, endless bands thereof and even disks of the magnetic material for dictating machines and the like.

However, attempts to apply magnetic recording principles to certain commercial processes have proven to be ineffective. For example, it has been suggested to provide continuous strips of labels, tickets or the like for price indication, inventory purposes, sales evaluation and even sales registry. Such tickets, coupons and labels are most frequently associated with merchandise and may be perforated or otherwise coded to enable automatic means to register the sale, record the price or operate various business machines. In recent years, for example, automatic cash-register installations have been proposed which respond to the coded labels, coupons and tickets to automatically register the price to be paid, provide a record of the sale for inventory purposes, etc. The advantages of such systems derive, in part, from the fact that merchandising personnel frequently record erroneous data, mistake the price of an item or otherwise produce errors in transferring legible data from the price ticket, for example, to a sales slip, inventory list or the like.

Attempts to overcome this disadvantage by applying magnetic traces to labels have, however, proven to be unsatisfactory since the labels, tickets or coupons are generally processed individually in automatic or manually operable printing machines such that the labels are subsequently severed automatically from the strip or are separated at perforations or score lines provided for this purpose. Such separation has invariable damaged magnetic strips extending continuously along the length of labels, tickets or coupons, thereby creating erroneous responses in the processing machines. Furthermore, earlier label systems have not been satisfactory because such labels are frequently handled and mistreated, are exposed to mechanical stress upon the merchandise, in preparation and upon removal, and are frequently damaged by exposure to dusty environments or the like. For example, it is not uncommon for the labels or tickets to be mutilated in handling by unskilled personnel or potential purchasers. In addition, the use of magnetic layers on coupons, tickets or labels in most merchandising establishments results in an electrostatic adhesion of dust or the like onto the magnetic surfaces which, upon later processing, serves to contaminate the magnetic censors or heads which are to respond to the coded areas.

3. OBJECTS OF THE INVENTION

It is, therefore, the principal object of the present invention to provide an improved ticket, label or coupon system, capable of magnetic or manual processing, which avoids the aforedescribed disadvantages.

It is another object of the invention to provide a system of the character described which cannot contaminate sensing devices or the like of electronic processing machinery.

4. SUMMARY OF THE INVENTION

These objects and others which will become apparent hereinafter, are attained, in accordance with the present invention, in a label strip subdivided longitudinally into a plurality of sections adapted to be separated one from another to constitute individual labels, tickets or coupons.

Along one edge of the strip, there is provided a magnetic trace which is subdivided longitudinally into zones, each of which is confined to one of the sections, the zones being spaced apart across the region traversed by the separation line between such zones. The magnetic zone, possibly composed of a magnetic ink but preferably comprising a layer of magnetically polarizable material, is provided along a broad surface of the section at one end thereof so that the remainder of each section is a broad surface to which legible matter may be applied by handwriting, typescript or printing.

In practice, such labels, coupons or tickets will be legibly imprinted with the various merchandise data commonly provided on sales tickets, including sales-department identification, inventory or item description, size and price, while all or a portion of such data is magnetically recorded on the zone adjacent the legible matter. The labels are processed in large number, i.e. in label-duplicating machines, and are separated from one another along perforations or score to be applied to the merchandise by adhesive, string or other attachment means.

Since the zones terminate short of the separation line, the tickets, labels or coupons may be separated one from the other without any damage to the magnetic zones. Advantageously, the zones lie slightly inwardly from an edge of the corresponding section and from a longitudinal edge of the strip of labels and are thereby protected from damage which might otherwise occur at this edge.

Along the tear line, according to the invention, I provide a weakened zone, e.g. by scoring or perforation to facilitate separation of the sections from one another. According to an important feature of the invention, therefore, the magnetic zone lies, along all of its sides, inwardly from corresponding edges of the section.

Furthermore, the magnetic layer is preferably provided with a protective covering adapted to prevent damage to the material of this layer. In accordance with an embodiment of the invention, the magnetic zone is formed from a ferrite layer bonded to a synthetic-resin foil, the magnetic layer being adhesively secured face down to the substrate so that the foil constitutes a protective layer. Alternatively, the foil is fixed to the substrate as a support for the magnetic material. In both cases, but particularly the latter, I have found it to be advantageous to provide a protective covering over the magnetic zone.

Preferably, this protective covering is an antistatic lacquer capable of preventing electrostatic adhesion of dust or other solid materials to the magnetic layer. As a result, the package or the individual labels may be stored in public places and need not be protected in dust-free enclosures, without adversely affecting the sensing means in the automatic processing machines responding to the tickets.

5. DESCRIPTION OF THE DRAWING

The above and other objects, features and advantages of the present invention will become more readily apparent from the following description, reference being made to the accompanying drawing in which.

6. DESCRIPTION

Figures 1, 3:
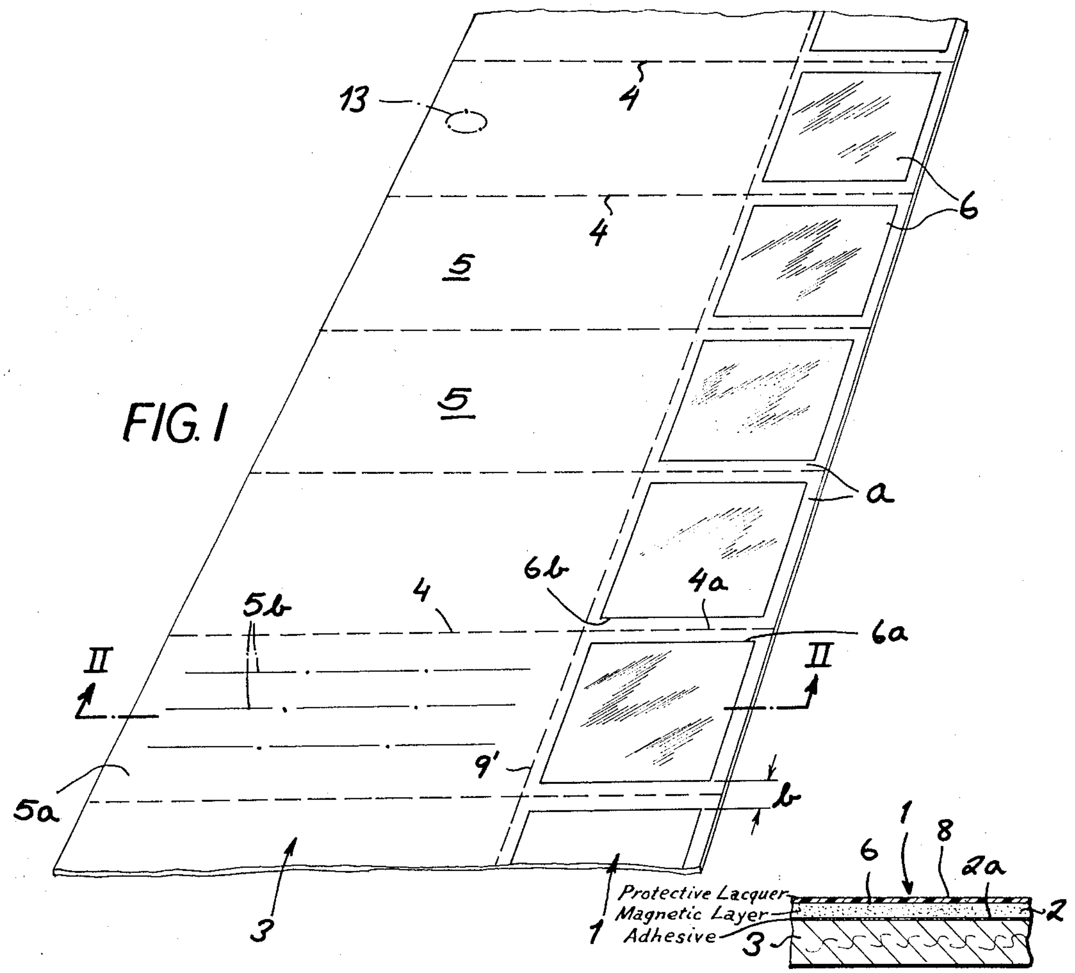
FIG. 1 is a perspective view of a continuous strip of coupons, tickets or labels in accordance with the present invention.
FIG. 3 is a detail view of the region III thereof.

In FIGS. 1 and 3, I show a continuous or elongated strip 3 of labels, tickets or coupons generally represented at 5 and formed by separating the coupons from one another along transverse lines 4 of perforations or scoring.

The broad surface 5*a* of each of the labels may carry legible matter as represented diagrammatically at 5*b* and can be separated from the respective magnetic zone 1 by a further row of perforations 9. The labels 5 may be printed in large numbers in automatic label-making machines which, simultaneously magnetically record the appropriate data upon the individual magnetic zones 6 of the trace 1.

Each of the magnetic zones 6 is shown to be of approximately square configuration and to lie inwardly by a margin *a* of all of the edges of the ticket, upon separation thereof from the strip. It is essential to the present invention, however, that the leading edge 6*a* of one of the magnetic zones 6 lies rearwardly from the corresponding row of perforations 4*a*, while the trailing edge 6*b* of the next-forwardly zone 6 is likewise spaced from the row or perforations 4*a*. The two zones are thereby separated by a distance $b = 2a$. From FIG. 1 it is also apparent that magnetic trace 1 occupies only a small fraction of the width of the strip 3 and, preferably, approximately one-third of the length of each of the tickets, coupons or labels.

Figure 2:
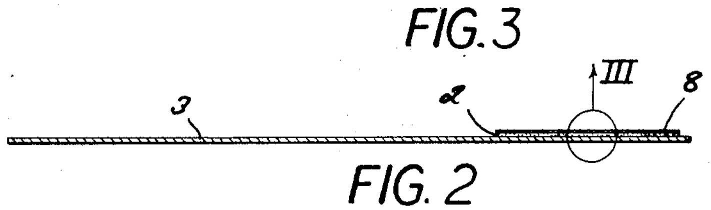
FIG. 2 is a section taken along the line II - II thereof.

From FIGS. 2 and 3, it can be seen that the substrate 9, which is composed of paper, may receive the magnetic zone 6 in the form of a magnetic layer 2, e.g. of gamma ferric (iron) oxide, the latter being applied by an adhesive or cement at an interface 2*a*. Above this layer 2, there is provided a protective coating 8 of an antistatic lacquer.

Figure 4:
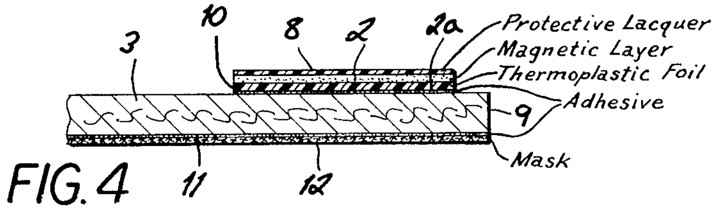
FIGS. 4 and 5 are cross sections illustrating other embodiments of the present invention.

In the embodiment of FIG. 4, however, it is apparent that the magnetic zone comprises a thermoplastic foil strip, e.g. polyterephthalate resin, as represented at 10 which is bonded by the adhesive layer 2*a* to the substrate 9. The foil 10, in turn, carries the magnetic layer 2 and the entire zone is covered with the protective lacquer.

Figure 5:
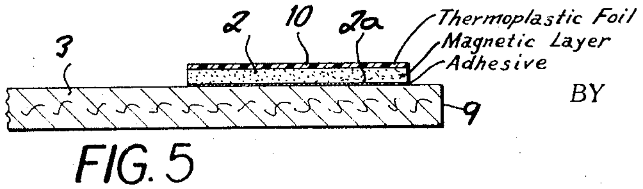

In the arrangement of FIG. 5, however, the thermoplastic foil 10 constitutes the protective layer while the magnetic layer 2 bonded thereto is secured to the substrate 9 by the adhesive layer 2*a*. While no antistatic lacquer is required in this case, a coating of the antistatic material may nevertheless be provided to reduce adhesion of dust to the magnetic zone.

After separation of the tickets, coupons or labels, they may be applied to the merchandise by an adhesive layer (e.g. as represented at 11). The adhesive layer is preferably of the contact type from which a paper shield 12 may be stripped to render the label effective. Alternatively holes or the like may be provided as represented at 13 in FIG. 1 to permit a string, wire or other fastener to be threaded through the ticket or label to be secured at a garment or other merchandise. The labels, tickets or coupons may be of conventional paper stock with, for example, a thickness of 75 microns or less, or of cardboard or paperboard stock with a thickness of 80 microns or more. When relatively thick tickets are to be printed, I prefer to recess the magnetic zone beneath the surface of the ticket or at most flush therewith. The lacquer may be made by dissolving 20 grams of vinyl acetate polymer in 100 cc of a mixture of three parts of toluene and one part of 95 percent ethyl alcohol. The thermoplastic foil carrying the magnetic layer is preferably a polyterephthalate resin and may have a thickness ranging between 5 and 25 microns. Best results are obtained when the thickness of the lacquer ranges between 1 micron and about 15 microns, the adhesive consists of a solvent of 100 ml acetone, 45 ml amyl acetate, 15 ml butyl acetate, 15 ml ethylacetate and 1.5 ml ethyl abietate, the solvent being saturated with nitrated cotton.

I claim:

1. A label, ticket or coupon system comprising an elongated strip of a flexible substrate formed with longitudinally-spaced transversely extending weakened zones impressed into and subdividing said strip into a succession of individually separable sections, each of said sections having a broad surface adapted to receive legible matter; a magnetic recording trace consisting of a layer of magnetic material extending along one edge of said strip and constituted of a succession of rectangular longitudinally-spaced magnetic-recording zones along one longitudinal edge of the strip and on each of said sections and spaced inwardly from the respective weakened zones and from all edges of said strip; and an antistatic lacquer coating on each zone of said magnetic material.

2. The system defined in claim 1, further comprising a thermoplastic foil bonded to said magnetically polarizable layer and secured to said substrate.

3. The system defined in claim 1 wherein said weakened zones are rows of perforations formed in said substrate.

4. The system defined in claim 1 wherein said substrate is scored to define said weakened zones.

* * * * *